No. 623,856. Patented Apr. 25, 1899.
M. L. WILLIAMS.
COUPLING FOR CHAINS FOR BICYCLES, &c.
(Application filed Dec. 2, 1897.)

(No Model.)

Witnesses.

Inventor.
M. L. Williams
By James J. Sheehy
Attorney

UNITED STATES PATENT OFFICE.

MARTIN L. WILLIAMS, OF TACOMA, WASHINGTON.

COUPLING FOR CHAINS FOR BICYCLES, &c.

SPECIFICATION forming part of Letters Patent No. 623,856, dated April 25, 1899.

Application filed December 2, 1897. Serial No. 660,558. (No model.)

*To all whom it may concern:*

Be it known that I, MARTIN L. WILLIAMS, a citizen of the United States, residing at Tacoma, in the county of Pierce and State of Washington, have invented new and useful Improvements in Sprocket-Chains, of which the following is a specification.

My invention relates to couplings for the links of chains, and contemplates the provision of a coupling which, while adapted to effectually prevent casual disconnection of the links, permits of the same being readily disconnected when it is desired to remove links and shorten the chain or for any other purpose, and also permits of the links being as readily connected, and this without the employment of any implement.

With the foregoing in view the invention will be fully understood from the following description when taken in conjunction with the annexed drawings, in which—

Figure 1:
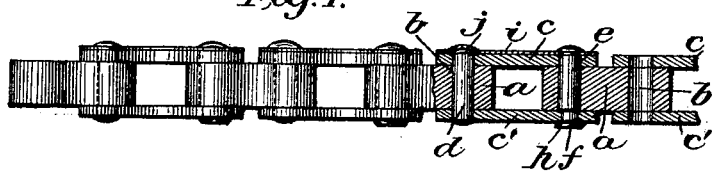
Figure 2:
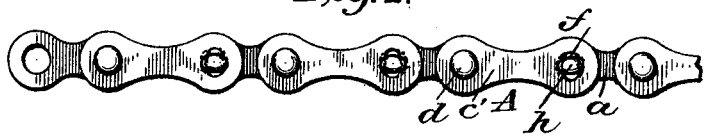
Figure 3:
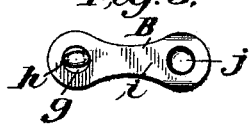
Figure 4:
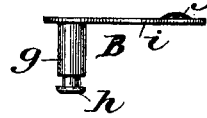

Figure 1 is a view, partly in plan and partly in section, of a sprocket-chain embodying my improvements. Fig. 2 is a side elevation of the same. Fig. 3 is a side elevation of one of my improved couplings, and Fig. 4 is a plan view of the same.

Referring by letter to the said drawings, A designates the links comprised in the sprocket-chain, and B designates my improved couplings, through the medium of which the links are detachably connected. The links A, as best shown in Fig. 1, respectively comprise a member $a$, which is provided with transversely-disposed apertures $b$ adjacent to its ends, and members $c\ c'$, which are disposed at opposite sides of the member $a$ and have one of their ends pivotally and permanently connected thereto by a transverse bolt $d$, which extends through one of the apertures of said member $a$ and is headed at its opposite ends, as shown. Adjacent to its free end the link member $c$ is provided with a transverse aperture $e$, while the member $c'$ is provided with an aperture $f$, which is oblong and extends lengthwise in a direction at right angles to the length of the link, after the manner shown in Fig. 2, for a purpose presently described.

The couplings B for connecting links constructed as above described respectively comprise a bolt $g$, having an oblong head $h$ at one end, and a resilient plate $i$, which is connected to the opposite end of the bolt, is disposed in the same direction as the elongation of the head $h$ of the bolt, and is provided adjacent to its free end with a depression $j$, designed to seat one end of a bolt $d$, as presently described.

In connecting two of the links A through the medium of one of my improved couplings the member $a$ of one link is interposed between the free ends of the members $c\ c'$ of the other link, after which the bolt $g$ is passed through the member $c$, the member $a$, and the member $c'$ in the order named, the resilient plate of the coupling being held at right angles to the members $c\ c'$ in order to enable the oblong head $h$ to pass through the oblong aperture $f$ of the link member $c'$. With this done the resilient plate $i$ of the coupling is turned down alongside the member $c$ of one link and is sprung over the head of the bolt $d$ of said link, which head is received in the depression $j$ of the resilient plate and serves to hold the same against casual movement. Inasmuch as the turning of the bolt $g$ places its head $h$ at right angles to the length of aperture $f$ and the springing of the resilient plate $i$ over the head of bolt $d$ and the seating of said bolt-head in the depression of the plate holds said plate against casual movement, it follows that casual disconnection of the links is practically impossible. When, however, it is desired to disconnect the links for any purpose, it is simply necessary to spring the resilient plate of the coupling out of engagement with the bolt $d$, turn said plate to a position at right angles to the links, and then withdraw the bolt $g$, when the links may be readily separated. The springing of the plates $i$ of the couplings into and out of engagement with the bolts of the links does not injure the plates, and it therefore follows that the couplings may be repeatedly used for an indefinite length of time.

In practice my improved couplings may be employed for connecting all of the links of a chain, or some of the links may be connected by ordinary means and others through the medium of my improved couplings, as desired.

When the construction of the links is such that the heads of the bolts connecting the link members are countersunk, the resilient plates of the couplings may be provided with projections designed to be sprung into engagement with either edge of the link to hold the plates against casual movement for the purpose before stated.

I would further have it understood that my improved couplings may be used for connecting any type of links that they are applicable to and that I do not desire to confine myself to the specific embodiment of my invention herein shown and described, as such changes or modifications may be made in practice as fairly fall within the scope of my invention.

It will be noticed that the bolts of the couplings are reduced adjacent to their heads $h$. This is done in order that the oblong apertures $f$ may be made of a length corresponding to the diameter of the apertures $b\ e$, and while desirable is not essential.

Having thus described my invention, what I claim is—

1. In a sprocket-chain, the combination of two links having coincident apertures one of which is elongated, and a coupling comprising a bolt extending through the apertures of the links and having an elongated portion, and a plate fixedly and permanently connected to the bolt and disposed at right angles to the same; said plate being so arranged that when it lies alongside one link, the oblong portion of the bolt stands at an angle to the length of the oblong aperture in the link, substantially as specified.

2. In a sprocket-chain, the combination of two links having coincident apertures, one of which is oblong, and a coupling comprising a bolt adapted to take through the apertures of the links and having an oblong head or portion, and a resilient plate connected and arranged at right angles to the bolt and adapted to be sprung into engagement with one link; said plate being so disposed that when it is placed at the side of the link the head of the bolt will stand at an angle to the length of the oblong aperture in the link, substantially as specified.

3. In a sprocket-chain, the combination of a link comprising a member $a$, members $c\ c'$ disposed at opposite sides of the member $a$ and having apertures $e\ f$ respectively, the aperture of the member $c'$ being oblong, a bolt $d$ permanently connecting the members $a, c, c'$, a second link having a member $a$ interposed between the link members $c\ c'$ and having an aperture coincident with the apertures $e\ f$ thereof, and a coupling comprising a bolt extending through said coincident apertures and provided with an oblong head, and a resilient plate permanently and fixedly connected to the bolt and disposed at right angles to the same and provided with a depression adapted to seat one end of the bolt $d$, substantially as specified.

MARTIN L. WILLIAMS.

Witnesses:
J. H. EASTERDAY,
J. AUSTIN WOLBERT.